3,008,965
DEHYDROGENATION OF NITROGEN HETEROCYCLICS

Robert J. Zellner, Marinette, Wis., assignor to Ansul Chemical Company, Marinette, Wis., a corporation of Wisconsin
No Drawing. Filed Oct. 21, 1959, Ser. No. 847,705
8 Claims. (Cl. 260—313)

This invention relates to the dehydrogenation of organic compounds, and more particularly to the dehydrogenation of nitrogen containing heterocyclic compounds.

Unsaturated nitrogen heterocyclic compounds such as N-methyl pyrrole and pyrrole are being used as corrosion inhibitors for chlorinated hydrocarbons. These inhibitors have been prepared by prior processes from the saturated compounds, N-methyl pyrrolidine and pyrrolidine, but these processes employ such high temperatures that substantial quantities of these products are decomposed or are converted to undesirable isomers. (Reppe, W., et al., Ann., 596, 155.)

It is an object of this invention to provide a process for dehydrogenation of nitrogen heterocyclic compounds at a low temperature. It is another object of this invention to provide a process for the dehydrogenation of nitrogen heterocyclics which will provide a high rate of conversion at low temperatures.

The objects of this invention are attained by passing pyrrolidine vapors (or those of its N-substituted alkyl or alkenyl homologs) at a temperature from about 175° to about 350° C. over a catalyst comprising palladium chloride supported on alumina. The life of the catalyst is improved if the vapors contain a small percentage of steam but this is not essential. This novel process provides an economical method for producing unsaturated nitrogen heterocyclics of good purity.

My preferred catalyst was prepared by depositing approximately 0.5% of palladium (as its aqueous chloride solution) on an activated alumina base having a surface area of about 100 sq. meters per gram. Palladium chloride was obtained as an aqueous solution containing 1 gram of metal per 10 grams of solution. Seventy-five grams of this solution were diluted to 600 grams with distilled water and sprayed on to 1500 grams of Houdry grade 100 S alumina catalyst containing by weight a minimum of 98.5% $Al_2O_3$ and 0.1 to 0.2% $Na_2O$ and having a surface area of 75–85 m.$^2$/g. and 60–65% vol. porosity. This was dried 12 hours at 150° C. before use. The amount of palladium on the catalyst has been varied from as low as 0.1% to above 1.0% and satisfactory operation can be attained in this range except that at the lower palladium chloride concentrations a longer contact time at temperature is required. An alumina with a surface area of 350 sq. meters/gram has also been used as a catalyst base, but with this base the catalyst life was somewhat diminished. A silica-alumina (87% silica and 13% alumina by weight) was also used as a base with some success, but provided a less active catalyst than alumina only. A catalyst base with surface area of as little as 35 sq. meters/gram was also used with only a moderate reduction in catalyst activity.

The process has been employed with the catalyst in the form of granules or pellets supported in a fixed bed apparatus and also in a fluidized bed reactor with a catalyst of a particle size suitable for this type of operation. The reaction is quite endothermic and provisions must, therefore, be made to supply the necessary heat to maintain the reaction temperature.

The following examples will illustrate the nature of the invention but the invention is not restricted to these examples.

Example 1

N-methyl pyrrolidine was passed at a rate of 700 cc. per hour through a reactor containing 1 liter of catalyst at 275 to 300° C. Catalyst was 0.5% palladium, as its chloride, supported on an alumina base of 100 sq. meters/gram. Conversion to N-methyl pyrrole varied between 45 and 55% and remained at this level for 12 to 15 hours at which time it began to fall slightly. Conversion was restored to its former level by increasing the temperature of the catalyst bed to 310° C. As the run continued, the rate of conversion was maintained by compensating a decline in catalyst activity with an increase in reaction temperature until the catalyst bed was at 350° C., at which time the supply of raw material was exhausted.

Example 2

In the preparation of N-methyl pyrrolidine by passing methanol, ammonia and tetrahydrofuran over activated alumina at a temperature of about 350° C., a fraction (possibly an azeotrope) is obtained which contains these reagents and 85% by weight N-methyl pyrrolidine. When this fraction was fed to the reactor as in Example 1, about 85% of N-methyl pyrrolidine was converted to N-methyl pyrrole.

In the above examples, the gases issuing from the reactor were condensed and the condensate dried over solid sodium hydroxide. The dried, non-aqueous layer was fractionally distilled to separate any unconverted starting material from the product.

The purity of the N-methyl pyrrole produced by this procedure was in excess of 98% (as determined by freezing point techniques).

Example 3

The procedure of Example 1 was repeated except that the feed consisted of pyrrolidine. The conversion to pyrrole was 65%.

Example 4

The procedure of Example 1 was repeated except that N-propyl pyrrolidine was fed to the reactor instead of N-methyl pyrrolidine. Conversion to N-propyl pyrrole was in excess of 50%.

In the foregoing examples "conversion" is the moles of product obtained divided by moles of product fed to the reactor.

"Yield" is calculated as moles product obtained divided by moles of starting material not recovered. Since almost all the material not recovered as product can be recycled to the reactor for additional reaction, yields resulting from the use of the process described in the above examples were in most cases in excess of 90%.

Good conversions have been also obtained in dehydrogenations at temperatures as low as 180–200° C., but in these cases the contact time was correspondingly lengthened to maintain a high rate of conversion.

Example 5

N-butylene pyrrolidine (boiling point 155° C., $N_D^{20}$ 1.4575) was passed at a rate of 1000 cc. per hour per liter of catalyst through a reactor at 300° C. containing a catalyst comprising 0.5% by weight palladium as its chloride supported on an alumina base having 100 sq. meters/gram. The gases issuing from the reactor were condensed and fractionally distilled to collect the N-butylene pyrrole (boiling point 171–173° C., $N_D^{20}$ 1.4731).

Example 6

N-hexyl pyrrolidine (boiling point 201° C., $N_D^{22}$ 1.444) was passed at a rate of 700 cc. per hour per liter of catalyst through a reactor at 275–300° C. containing a catalyst comprising 0.5% by weight palladium, as its chloride, supported on an alumina base having a surface area of 100 sq. meters/gram. The gases issuing from the reactor were condensed and fractionally distilled to collect the N-hexyl pyrrole (boiling point 210-215° C., $N_D^{22}$ 1.4698). Conversion was about 75%.

*Example 7*

To a semi-works reactor containing 200 pounds of catalyst at 175-200° C., 6,000 pounds of a N-methyl pyrrolidine fraction containing approximately 75% N-methyl pyrrolidine were fed over a period of 100 hours. 3300 pounds of N-methyl pyrrole were produced in this run and some N-methyl pyrrolidine was recovered for recycle. Activity of the catalyst was only slightly diminished at the end of the run.

When the catalyst is spent, apparently due to carbon deposition on its surface, it may be regenerated by burning off the carbon in an atmosphere of low oxygen content. This regeneration procedure is very exothermic and care must be exercised to avoid excessive temperatures which destroy the activity of the catalyst. Excessive catalyst temperatures should be avoided at all times, as even fresh catalyst can be rendered inactive by heating for several hours at 500° C.

I claim:
1. A process for producing pyrrole and N-substituted pyrroles from heterocyclic compounds selected from the group consisting of pyrrolidine and N-substituted homologs of pyrrolidine, the N-substituted homologs of pyrrolidine being selected from the group consisting of N-alkyl pyrrolidine and N-alkenyl pyrrolidine, which comprises passing the heterocyclic compounds at a temperature between about 175° C. and 350° C. over a catalyst consisting essentially of a base comprising alumina having a surface area of between about 35 and 350 sq. meters per gram and as the active ingredient, at least about 0.1% by weight of palladium as its chloride.

2. A process for the preparation of an N-alkyl pyrrole in which the alkyl group has 1 to 6 carbon atoms which comprises the passage of the corresponding N-alkyl pyrrolidine over a catalyst at a temperature between about 175° C. and 350° C., said catalyst consisting essentially of at least 0.1% by weight of palladium as its chloride on an alumina base having a surface area between about 35 and 350 square meters per gram.

3. A process for the preparation of N-methyl pyrrole which comprises the passage of N-methyl pyrrolidine over a catalyst at a temperature between about 175° C. and 350° C., said catalyst consisting essentially of at least 0.1% by weight of palladium as its chloride on an alumina base having a surface area between about 35 and 350 square meters per gram.

4. A process for the preparation of pyrrole which comprises the passage of pyrrolidine over a catalyst at a temperature between about 175° C. and 350° C., said catalyst consisting essentially of at least 0.1% by weight of palladium as its chloride on an alumina base having a surface area between about 35 and 350 square meters per gram.

5. A process for the preparation of N-propyl pyrrole which comprises the passage of N-propyl pyrrolidine over a catalyst at a temperature between about 175° C. and 350° C., said catalyst consisting essentially of at least 0.1% by weight of palladium as its chloride on an alumina base having a surface area between about 35 and 350 square meters per gram.

6. A process for the preparation of N-butylene pyrrole which comprises the passage of N-butylene pyrrolidine over a catalyst at a temperature between about 175° C. and 350° C., said catalyst consisting essentially of at least 0.1% by weight of palladium as its chloride on an alumina base having a surface area between about 35 and 350 square meters per gram.

7. A process for the preparation of N-hexyl pyrrole which comprises the passage of N-hexyl pyrrolidine over a catalyst at a temperature between about 175° C. and 350° C., said catalyst consisting essentially of at least 0.1% by weight of palladium as its chloride on an alumina base having a surface area between about 35 and 350 square meters per gram.

8. The process of claim 1 wherein the amount of palladium as its chloride in the catalyst ranges from about 0.1 to 1% by weight of the catalyst.

References Cited in the file of this patent
UNITED STATES PATENTS

| | | |
|---|---|---|
| 2,671,789 | Copes et al. | Mar. 9, 1957 |
| 2,814,599 | Lefrancois et al. | Nov. 26, 1957 |
| 2,841,626 | Holzman et al. | July 1, 1958 |
| 2,927,088 | Michalko et al. | Mar. 1, 1960 |

OTHER REFERENCES

Zelinsky et al.: Chemische Berichte, pp. 101-103, vol. 64 (1931).

Adkins et al.: J. American Chemical Society, vol. 71, pp. 2964-2965 (1949).